United States Patent
Willins et al.

(10) Patent No.: US 7,573,366 B2
(45) Date of Patent: Aug. 11, 2009

(54) METHOD AND SYSTEM FOR RF ACTIVATION OF RF INTERROGATORS

(75) Inventors: Bruce A. Willins, East Northport, NY (US); Richard Vollkommer, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 436 days.

(21) Appl. No.: 11/095,348

(22) Filed: Mar. 31, 2005

(65) Prior Publication Data
US 2006/0220791 A1   Oct. 5, 2006

(51) Int. Cl.
*G06K 19/00* (2006.01)

(52) U.S. Cl. .............. 340/5.61; 340/5.64; 340/10.1; 340/10.2; 340/10.33; 340/10.5; 340/5.1; 340/5.2; 340/5.6

(58) Field of Classification Search ............. 340/10.1, 340/825.49, 825.52, 10.3, 10.31, 10.34, 10.5, 340/5.61, 5.64, 10.2, 10.33
See application file for complete search history.

(56) References Cited

U.S. PATENT DOCUMENTS

| | | | | |
|---|---|---|---|---|
| 5,455,575 A | * | 10/1995 | Schuermann | 342/42 |
| 5,969,597 A | * | 10/1999 | Weigl et al. | 340/5.61 |
| 6,192,222 B1 | * | 2/2001 | Greeff et al. | 455/106 |
| 6,323,566 B1 | * | 11/2001 | Meier | 307/10.2 |
| 6,681,990 B2 | * | 1/2004 | Vogler et al. | 235/385 |
| 2004/0174244 A1 | * | 9/2004 | Eidemiller | 340/5.61 |

FOREIGN PATENT DOCUMENTS

EP   0870889   * 10/1998

* cited by examiner

*Primary Examiner*—Vernal U Brown (57) ABSTRACT

Described is a method and system for detecting a first trigger event using a trigger device, the trigger device including a trigger sensor and a trigger tag. Listening on a predetermined radio frequency band by an interrogator for an activation signal, wherein the activation signal is generated by the trigger tag, the activation signal including a unique identifier of the trigger tag and receiving the activation signal. The activation signal is then validated as being received from an associated trigger tag and the interrogator is activated into an interrogation mode upon validation of the activation signal.

21 Claims, 4 Drawing Sheets

METHOD AND SYSTEM FOR RF ACTIVATION OF RF INTERROGATORS

BACKGROUND INFORMATION

Radio Frequency Identification ("RFID") technology has been around for many years, but in the past few years there has been a surge in its acceptance and a massive growth in its use. RFID technology generally involves the use of an interrogator to transmit an RF signal to a transponder in order to interrogate the transponder and obtain data stored therein. After receiving the interrogating RF signal, the transponder answers to the inquiry by backscattering or transmitting a responsive RF communication which contains the requested data.

RFID technology lends itself extremely well for use in asset tracking (e.g., tracking merchandise in retail environments or warehouses). Such an RFID tracking system, having a plurality of interrogators and a plurality of transponders placed on tracked objects, could be used to obtain information on the tracked objects' location or other status related data. However, this system requires installation of multiple interrogators around the trackable area. This results in a dense population of RFID interrogators. In addition, it has been a common practice in the art to have the interrogators constantly interrogating the transponders. However, the constant RF transmissions create RF interference between interrogators, thereby reducing interrogator performance and making them less effective at reading transponders.

There is a limited solution of reducing interference in order to improve interrogator productivity. One method involves using a triggering network that includes triggers connected to the interrogators using wired or wireless networks. The triggers activate the interrogators at appropriate times so that they only read the transponders at those specified times. Although this system improves reading productivity, it also adds complexity and cost to the overall system. Part of the additional cost is the implementation of additional equipment required to properly interface (e.g., hardware and/or software for a communication protocol) triggering devices with the RFID interrogators.

In addition, both wired and wireless communications in the triggering networks suffer from deficiencies. Wired networks require installation of obtrusive wiring and involve significant expense. Wireless networks suffer from similar limitations. Since most common wireless networks (e.g., IEEE 802.11 protocols, Bluetooth, etc.) use an out-of-band RF signals, than RFID interrogators, such networks require installation or integration of complimentary receivers and transceivers on the triggers and the interrogators. In addition, wireless networks have a high total cost of ownership due to the complexity of managing, administering, and diagnosing the network. Therefore, there is a need for a trigger network that is based on the RF communication medium native to the interrogators.

SUMMARY OF THE INVENTION

A method for detecting a first trigger event using a trigger device, the trigger device including a trigger sensor and a trigger tag. Listening on a predetermined radio frequency band by an interrogator for an activation signal, wherein the activation signal is generated by the trigger tag, the activation signal including a unique identifier of the trigger tag and receiving the activation signal. The activation signal is then validated as being received from an associated trigger tag and the interrogator is activated into an interrogation mode upon validation of the activation signal.

In addition, a system having a trigger device including a trigger sensor and a trigger tag, the trigger sensor detecting a trigger event, the trigger tag transmitting an activation signal upon detection of the trigger event, the activation signal including a unique identifier of the trigger tag. The system also includes an interrogator including a radio frequency receiving circuit to receive the activation signal, the interrogator validating the unique identifier of trigger tag in the activation signal and switching from a listening mode to an interrogation mode upon validation of the unique identifier.

Furthermore, a method of operating an interrogation device by listening, in a listening mode, on a predetermined radio frequency for an activation signal, validating the activation signal is received from one of associated trigger tags and switching from the listening mode to an interrogation mode, wherein the interrogation mode includes the emission of radio frequency waves to interrogate RFID tags.

DETAILED DESCRIPTION

Figure 1:
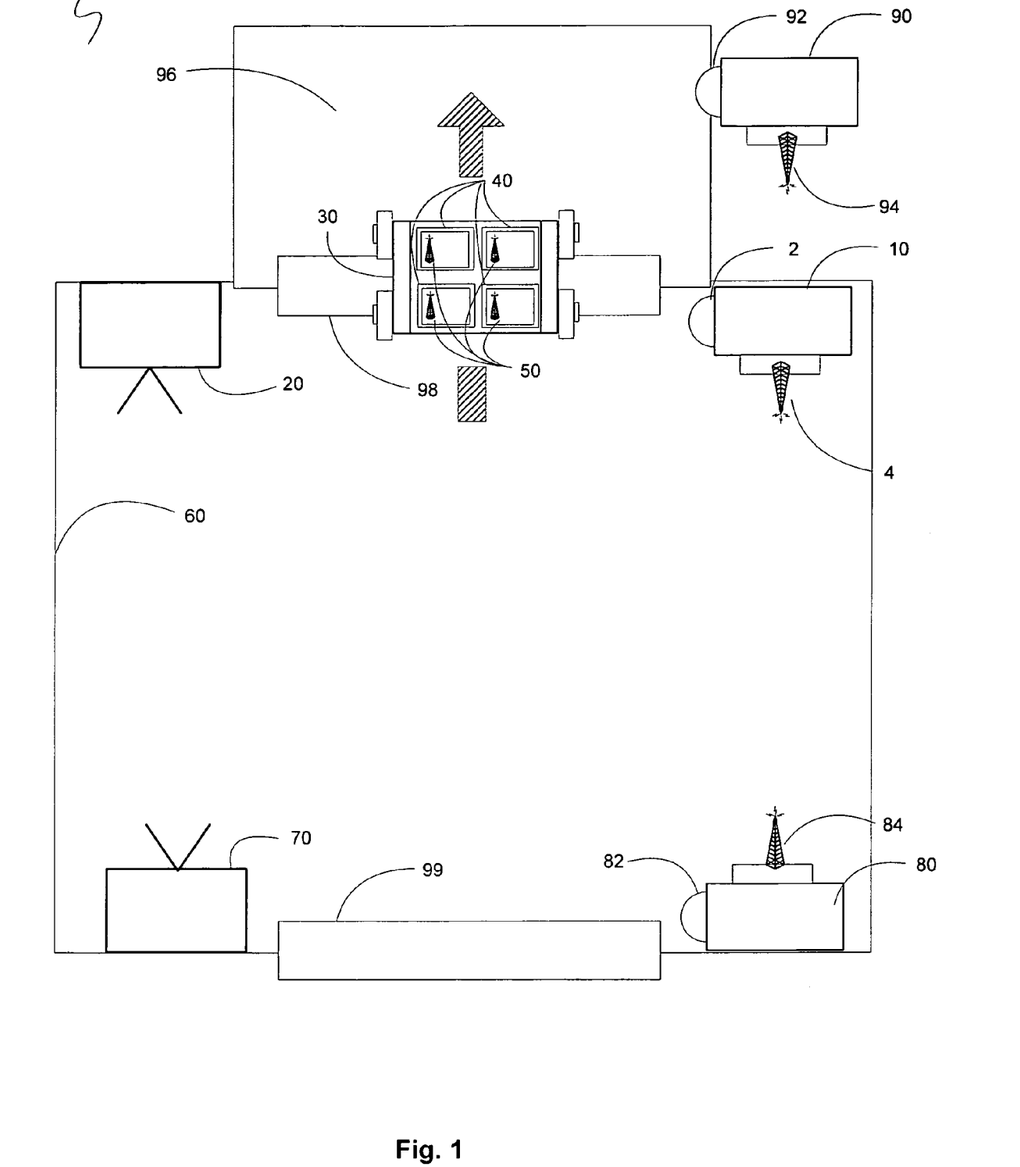
FIG. 1 is an exemplary embodiment of a trigger RFID network according to the present invention.

The present invention may be further understood with reference to the following description and the appended drawings, wherein like elements are provided with the same reference numerals. FIG. 1 shows an exemplary embodiment of a trigger RFID network 1 according to the present invention. The trigger network 1 is shown to be setup in a warehouse 60, although it may be utilized in any setting where a plurality of interrogators are required to track objects. The warehouse 60 includes doorways 98 and 99 as well as a loading dock 96. The trigger network 1 includes triggering devices 10, 80 and 90 and RFID interrogators 20 and 70. The trigger network 1 may be setup using at least one trigger sensor and at least one interrogator, however, there may be a plurality of triggering devices and interrogators included in the trigger network 1 depending on the tracking requirements for the particular application.

The trigger device 10 includes a trigger sensor 2, a trigger tag 4, as well as any internal circuitry necessary to interface its components, and a power source. The trigger devices 80 and 90 are similar to the trigger device 10.

The trigger sensor 2 may be any visual sensor that senses objects within its line of sight (e.g., electric eye beams, infrared sensors, motion detectors, etc.). The sensor 2 may also be a pressure sensor (e.g., piezzo electric sensors). In addition, the sensor 2 may be replaced by another trigger activator such as a switch (e.g., a trigger event occurs when a person enters the warehouse 60 and turns on the lights). When the sensor 2 detects an object within its range and/or line of sight, the trigger device 10 marks the detection as a trigger event.

The trigger tag 4 may be an RFID transponder, which includes internal circuitry, memory (e.g., read only or read/write) and processing capability, as well as an antenna (e.g., printed antennas, wound antennas, etc.). The trigger tag 4 may be manufactured in a variety of shapes and sizes and may be included in a hard case (e.g., plastic, glass, epoxy, etc.) or a label. In addition, the trigger tag 4 may communicate on different frequencies, operate on various protocols (e.g., "tag talks first," "reader talks first," etc.), as well as implement various anti-collision techniques during communications. In one exemplary embodiment specifically, the trigger tag 4 communicates using the EPC UHF protocol and utilizes a unique EPC value to each RFID device.

The trigger tag 4 may be either passive or active. A passive tag receives all the power required for a return transmission from the signal sent by the interrogating device. Thus, the tag is only powered when it is in the beam of the interrogating device. After receiving the RF wave, the transponder uses a backscatter technique to reply to the interrogating device. More specifically, the tag does not include a transmitter and instead simply reflects the carrier wave and includes its own response signal into that reflection.

Active tags, have not only a battery, but also include a transmitter capable of transmitting at any time to the interrogator, not just when the interrogator transmits a carrier wave. The trigger tag 4 is used to activate the interrogators. This activation will be discussed in detail below.

The trigger devices 10 and 80 are positioned at the doorways 98 and 99, respectively, while the trigger device 90 is positioned near the loading dock 96. One skilled in the art will understand that the trigger devices 10, 80 and 90 can be placed anywhere in the warehouse 60. However, the doorways 90 and 92 and the loading dock 96 represent strategic points in the warehouse 60 where most of the traffic occurs.

As shown in FIG. 1, a cart 30 passing in front of the sensor 2 is an exemplary trigger event. Thus, if the sensor 2 is a visual sensor, movement of the cart 30 through the beam constitutes a trigger event. If the sensor 2 is a pressure sensor, the wheels of the cart 30 putting pressure on a designated area (e.g., piezzo sensor strip) registers as a trigger event. These are exemplary embodiments and those skilled in the art will understand that triggers can be extracted from any number of events.

The cart 30 may contain a plurality of objects (e.g., crates 40) that include RFID tags 50. The RFID tags 50 may be attached to the objects so that they may be removable (e.g., RFID tags attached to clothing in department stores) or they may be permanently embedded in the objects (e.g., placed within the plastic housing of a crate). Similar to the trigger tag 4, the RFID tags 50 may be active or passive tags. However, it is more common for the RFID tags to be passive because of the lower costs associated with such tags.

Upon detecting a trigger event, the trigger device 10 uses the trigger tag 4 to activate interrogator 20. The method for activating the interrogator 20 varies depending on whether the trigger tag 4 is an active or passive tag, both of these embodiments are shown in FIGS. 2 and 3, respectively, and are discussed in further detail below.

Interrogator 20 includes internal circuitry (e.g., memory, processor, etc.), an antenna, a receiver and a transmitter, or a transceiver. The interrogator 70 is substantially similar to its counterpart—interrogator 20—and includes the same components. Preferably, the interrogator 20 is located near the doorway 98 so that it is placed in proximity to where the trigger event took place (i.e., the cart 30 passing in front of the trigger device 2). After receiving an activation signal from the trigger tag 4, the interrogator 20 interrogates the RFID tags 50 until it is deactivated.

Figure 2:
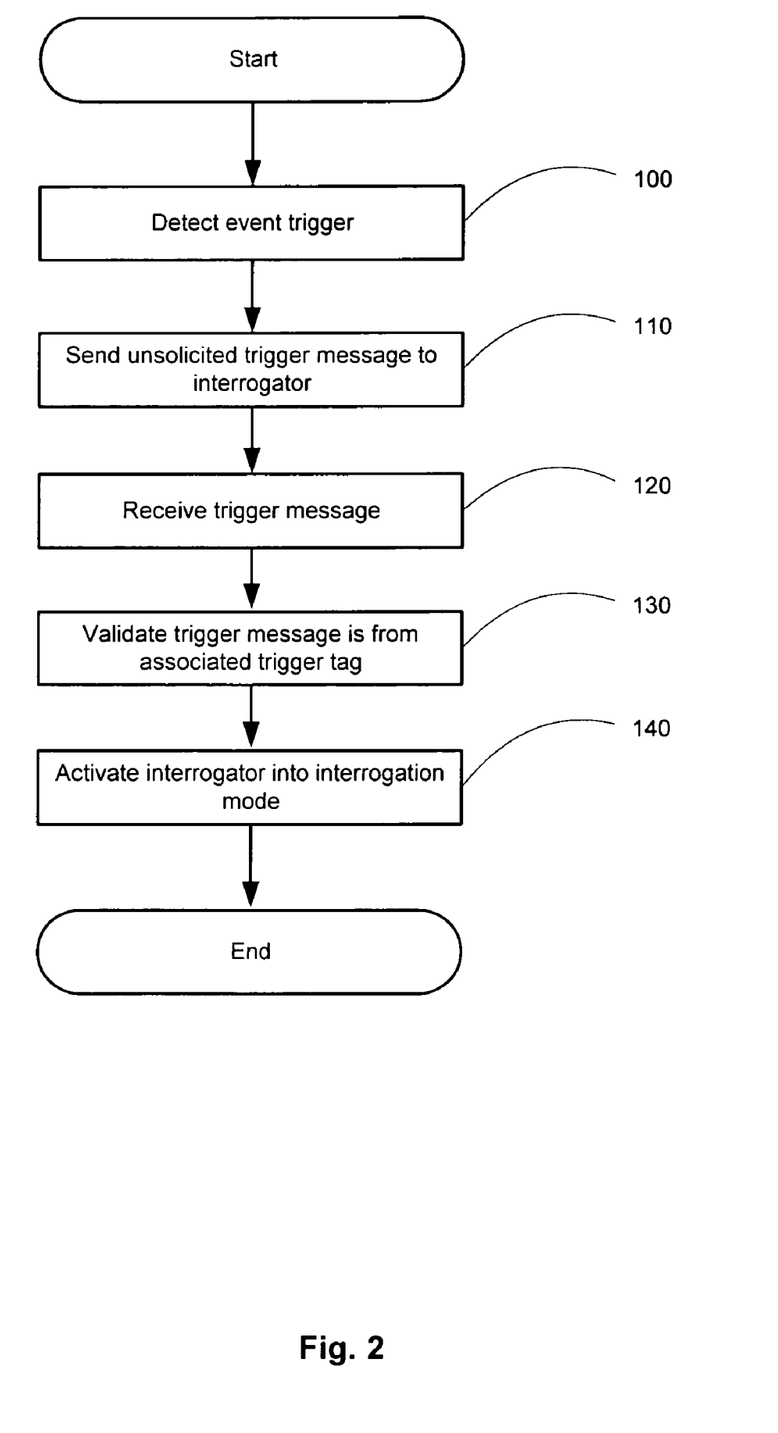
FIG. 2 is an exemplary embodiment of a method for triggering an interrogator using an active trigger tag according to the present invention.
Figure 3:
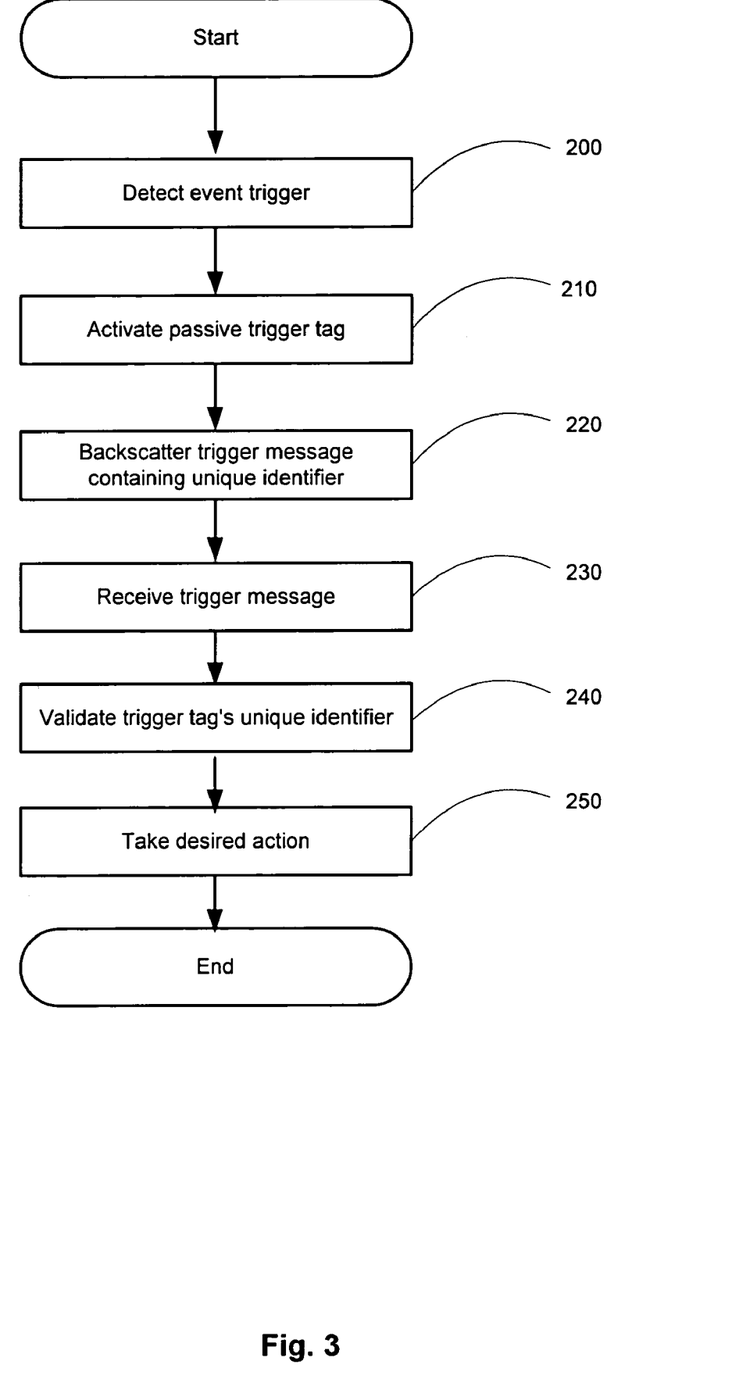
FIG. 3 is an exemplary embodiment of a method for triggering an interrogator using a passive trigger tag according to the present invention.

FIG. 2 shows an exemplary embodiment of activating the interrogator 20 by an active trigger tag 4 of the trigger device 10 according to the present invention. In step 100, the trigger device 10 detects a trigger event, such as when the cart 30 passes within the line of sight of the sensor 2 or the cart's wheels activate a pressure pad. These occurrences are flagged as trigger events by the trigger device 10.

In step 110, after the trigger event is detected, the trigger tag 4 sends an unsolicited message to the interrogator 20. All of the transmissions emitted from the trigger tag 4 are on the same band as the one used by the interrogator 20 to interrogate RFID tags 50. This in-band configuration eliminates the need to use additional equipment to interface the trigger device 10 with the interrogator 20. Preferably, the trigger tag 4 and the interrogator 20 are configured to communicate using the EPC UHF protocol, which operates on a 900 mHz band. It should be noted that the reference to the EPC protocol may be more properly termed a protocol similar to EPC. This is because when the interrogator 20 is in the listening mode and the trigger tag 4 sends an unsolicited mode, the communication is not strictly adhering to the EPC UHF protocol as when the interrogator is in the full interrogation mode. The purpose of defining the communication as similar to the EPC protocol is based on the EPC protocol allowing each device to have an individual unique identifying value which may be used to selectively activate or deactivate the interrogator 20. Thus, throughout this specification, where communication is described as an EPC communication, it may also refer to a communication in a protocol similar to the EPC protocol. Furthermore, as should be apparent from this description, any communication protocol that allows for the trigger tag 4 to have a unique identifier is acceptable to implement this exemplary embodiment.

The interrogator 20 remains in a listening mode in order to receive the unsolicited message from the trigger tag 4. During listening mode the interrogator 20 is passively listening only for a transmission of a trigger from the trigger tag 4 so that the interrogator may switch into interrogation mode. The listening mode is distinct from the interrogation mode in that the interrogator 20 does not emit RF signals which could cause RF interference. Thus, in listening mode, the interrogator 20 only the RF receiver of the interrogator is active.

In step 120, the interrogator 20 receives the unsolicited message that includes the unique number associated with the trigger tag 4. In step 130, the interrogator 20 verifies that signal is from a registered trigger tag. The interrogator 20 may verify that the trigger signal is received from an associated trigger tag 4 by, for example, comparing the received EPC value with the stored EPC values. If the values do not match, the interrogator 20 will not be activated into the interrogation mode, thereby preventing erroneous activation and creating interference with other readers.

In step 140, after the trigger message has been validated, the interrogator 20 is activated into interrogation mode. During this mode the interrogator 20 interrogates the RFID tags 50. The interrogation of the RFID tags 50 by the interrogator 20 will be performed in the standard manner. The information collected by the interrogator 20 from the RFID tags 50 may be sent to a control system for processing.

It is possible to associate the trigger tag 4 with multiple interrogators. For example, the trigger network 1 may activate interrogators 20 and 70 when the cart 30 passes near the sensors 2 and trigger device 10 sends a trigger message which is received by interrogators 20 and 70, both of which will be activated if Trigger tag 4 is associated with both interrogators 20 and 70. Similarly, a plurality of trigger tags may be associated with a single interrogator. For example, trigger messages from either the trigger devices 10 or 80 may activate the interrogator 20.

In a case where a single trigger tag may activate multiple interrogators other methods of avoiding interference may be employed. For example, an interrogator may emulate a trigger tag (e.g., trigger tags 4 or 84). Thus, a first interrogator (e.g., the interrogator 20) may be activated by a trigger tag. Upon completion of its interrogation cycle (e.g., a time interval, upon detection of no additional tags in its field of view etc.), the interrogator 20 may transmit a signal (e.g. an EPC trigger value) to interrogator 70 to activate the interrogator 70 according to the same method as shown in FIG. 2. Thus, the interrogator 20 emulates a trigger tag to activate a second interrogator 70.

In another example, multiple-interrogator activation may use defined time periods to avoid interference. For example, where interrogator 20 and interrogator 70 are both activated using the same trigger signal, the interrogators 20 and 70 may alternate interrogation cycles (e.g., interrogator 20 scans for 500 msec and interrogator 70 scans during the following 500 msec).

As discussed above, the trigger tag 4 may also be a passive or a semi-passive backscattering emulating tag. Semi-passive tags are similar to passive tags because they respond to interrogators by backscattering the carrier signal. However, semi-passive tags also receive power from an alternate power source (e.g., a battery) which provides power to the tag's circuitry. The alternate power source is generally a low power source compared to the power source of an active tag. The alternate power source allows the tag not to be exclusively dependent on the strength of the carrier signal. A semi-passive tag allows for longer range transmissions than a passive tag because the carrier signal from the interrogator may be used exclusively for backscattering rather than powering the internal circuitry of the semi-passive tag. Similarly, a lower power interrogation signal may also be used for a semi-passive tag because the power from the carrier signal does not need to be diverted to the tag's circuitry.

FIG. 3 shows an exemplary embodiment of a method for triggering an interrogator using a passive or semi-passive trigger tag according to the present invention. The method will be discussed using trigger tag 4 and the interrogator 20. However, it will be understood that any of the trigger tags 4, 84 and 94 may be either passive, semi-passive or active. The method will be described with respect to a passive tag, but it should be understood that the same method may be implemented for a semi-passive tag.

A passive transponder does not have internal power and therefore cannot transmit signals without the aid of another power source. A passive trigger tag requires a transmission from an interrogator to obtain power for a response signal. Thus, in this embodiment, the interrogator 20 will remain in interrogation mode so that the interrogator 20 may power the passive tag. However, the present invention allows for the passive tag to be masked until a triggering event occurs. Furthermore, the interrogator 20 may be programmed to interrogate for only the specific identification of the trigger tag 4, thereby reducing the interrogation cycle time. This reduces the interrogator 20 transmit time, thereby reducing possible interference with other interrogators in the vicinity of interrogator 20.

In step 200, a trigger event is detected in substantially the same way as described with reference to step 100 in FIG. 2. Examples of triggering events may be the cart 30 passing in front of the trigger device 2 or a switch being placed in a new position (e.g., the opening of a door closes a switch, the cart 30 running over a mat closes a switch, etc.). In step 210, detection of the trigger event activates the trigger tag 4. For example, the trigger tag 4 may be part of a circuit which includes a switch as described above. When the switch is in an open position, the circuit is not complete and therefore, the passive trigger tag 4 will not backscatter the carrier signal even though the interrogator 20 is in interrogation mode. However, when the switch closes based on the trigger event, the circuit is complete and the passive trigger tag backscatters the carrier signal.

In step 220, the trigger tag 4 emulates a backscattering signal to the interrogator 20. The backscattering signal from the trigger tag 4 contains a unique identifier, for example, an EPC value. As described above, the interrogator 20 may be in a full interrogation mode or it may be in a limited interrogation mode where it is only looking for the unique identifier of the trigger tag 4. In either case, in step 230, the interrogator 20 receives the unique identifier of the trigger tag 4. In step 240, the interrogator 20 verifies that signal is from the trigger tag 4 by comparing the received unique identifier with the stored unique identifier.

In step 250, the interrogator 20 takes the desired action based on receipt of the verified unique identifier. For example, in one case, the desired action may be to change the interrogator 20 from the limited interrogation mode (where it is only looking for the unique identifier of the trigger tag 4) to a full interrogation mode (where it reads all tags in its target range). In another example, the interrogator 20 may cause (or send a signal which causes) another action to occur. This example would include the situation described above where a door was opened and the circuit containing the passive trigger tag 4 is closed. Upon verifying the unique identifier of the trigger tag 4, the interrogator 20 may send a signal which causes the lights to turn on in the room where the door was opened. Those of skill in the art will understand that there are numerous examples of other actions which may occur after the verification of receipt of the unique identifier of the trigger tag 4.

The interrogation mode may also be terminated using trigger tags. In a first example, the trigger network 1 may include an additional trigger sensor 92 positioned at a loading dock 96 as shown in FIG. 1. The trigger sensor 92 may be positioned anywhere in the warehouse 60. However, preferably it should be positioned at a strategic point, such as where the continual occurrence of an event that earlier triggered the activation of the interrogator 20 will now deactivate it. For instance, the cart 30 passing through the doorway 98 activates the interrogator 20, as the cart 30 continues on its way toward the loading dock 96, all of the RFID tags 50 have been interrogated according to the methods shown in FIGS. 2 and 3 and the process may now be terminated. Therefore, it is preferable that the interrogation ends when the cart 30 reaches the loading dock 96, hence, the trigger sensor 92 is placed at that location.

The trigger device 90 is substantially similar to the trigger device 10 and includes similar components. The trigger tag 94 may be either active or passive. The interrogator 20 is already activated, since it is interrogating RFID tags 50, therefore the trigger tag 94 merely needs to send a signal to the interrogator 20 to move the interrogator 20 from interrogation mode to listening mode.

Figure 4:
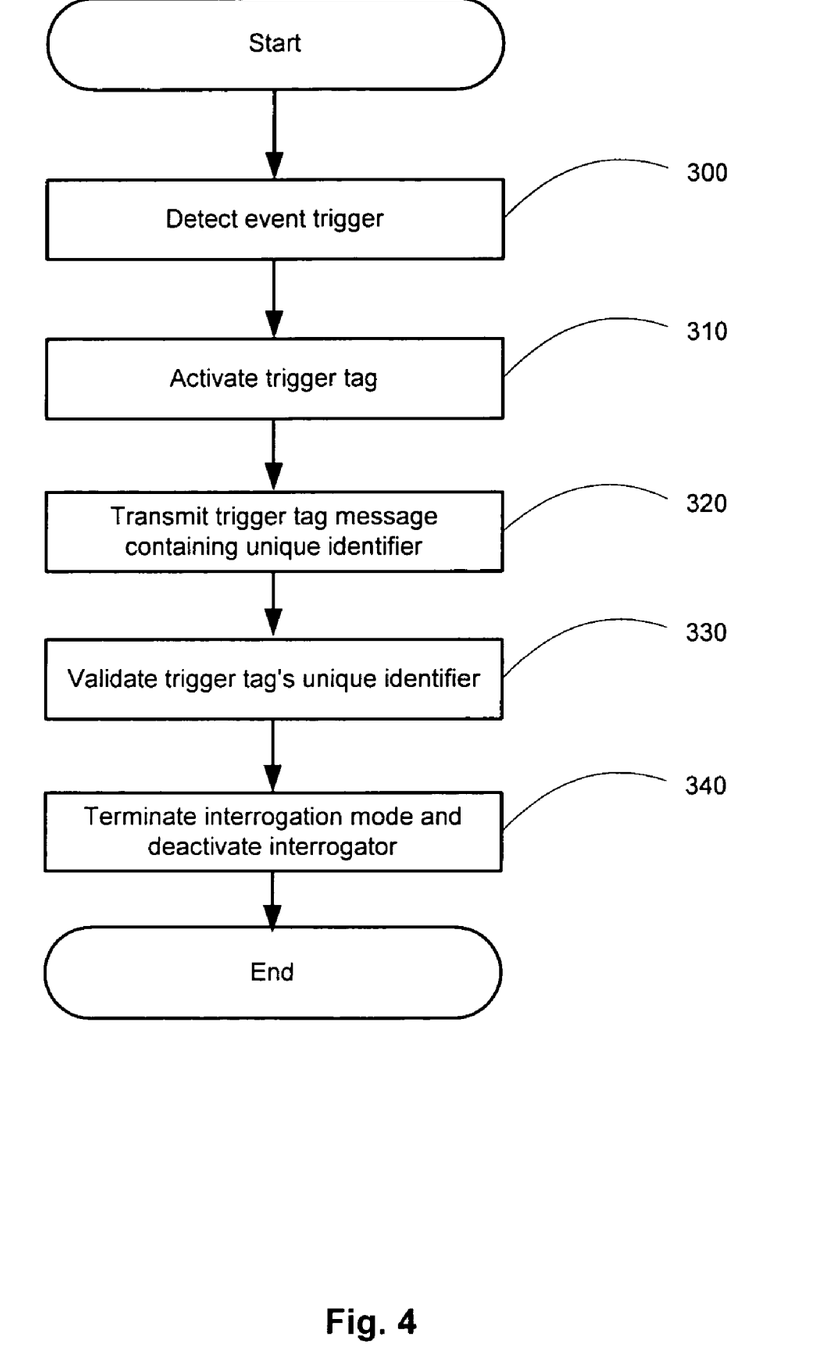
FIG. 4 shows an exemplary embodiment of a method for termination of interrogation mode using a trigger tag according to the present invention.

FIG. 4 shows an exemplary embodiment of a method for termination of interrogation mode using a trigger tag according to the present invention. In step 300, the trigger sensor 92 registers the cart 30 as it passes on its way to the loading dock 96. This registration is a trigger event and in step 310 results in activation of the trigger tag 94 (e.g., the trigger tag 94 is powered up). As described above, the trigger tag 94 may be either active or passive. In step 320, the trigger tag 94 transmits its unique identifier to the interrogator 20. If the trigger tag 94 is active, it sends an unsolicited trigger message containing the unique identifier. If the trigger tag 94 is passive, it emulates a backscattering signal containing the unique identifier.

In step 330, the interrogator 20 receives and validates the unique identifier. Since the unique identifier is associated with a specific command, in this case—termination of interrogation, the interrogator terminates its scanning for the RFID tags 50 in step 340.

The present invention provides a major improvement over existing trigger networks used for activating interrogators. It relies on the use of RFID trigger tags to communicate with the interrogators thereby maintaining all the signals emitted and received by the interrogators on one RF band and protocol.

The present invention has been described with the reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A method, comprising the steps of:
   detecting a first trigger event using a trigger device, the trigger device including a trigger sensor and a trigger tag;
   listening on a predetermined radio frequency band by an interrogator for an activation signal, wherein the activation signal is generated by the trigger tag, the activation signal including a unique identifier of the trigger tag;
   receiving the activation signal; validating that the activation signal was received from an associated trigger tag; and
   activating the interrogator into an interrogation mode upon validation of the activation signal, wherein prior to receiving the activation signal the interrogator only awaits receiving the activation signal from the trigger tag and is incapable of interrogating a radio frequency tag, and wherein after the interrogator is in the interrogation mode the interrogator interrogates the radio frequency tag and does not interrogate the trigger tag.

2. The method of claim 1, further comprising the step of: interrogating, while the interrogator is in the interrogation mode, radio frequency tags on the predetermined radio frequency band.

3. A method of claim 1, further comprising the steps of detecting a second trigger event using a second trigger device, the second trigger device including a second trigger sensor and a second trigger tag; listening on the predetermined radio frequency band by the interrogator for a deactivation signal, wherein the deactivation signal is generated by the second trigger tag, the deactivation signal including a second unique identifier of the second trigger tag; receiving the deactivation signal; validating that the deactivation signal was received from an associated trigger tag; and deactivating the interrogator into a listening mode upon validation of the activation signal.

4. The method of claim 1, wherein the unique identifier is an EPC value.

5. The method according to claim 1, wherein the trigger tag is an active tag and the activation signal is an unsolicited message.

6. The method according to claim 1, wherein the trigger tag is a passive backscattering tag that is masked prior to the trigger event.

7. The method according to claim 1, wherein the validation step includes comparing the unique identifier in the activation signal to unique identifiers stored in the interrogator.

8. A system, comprising:
   a trigger device including a trigger sensor and a trigger tag, the trigger sensor detecting a trigger event, the trigger tag transmitting an activation signal upon detection of the trigger event, the activation signal including a unique identifier of the trigger tag; and
   an interrogator including a radio frequency receiving circuit to receive the activation signal, the interrogator validating the unique identifier of trigger tag in the activation signal and switching from a listening mode to an interrogation mode upon validation of the unique identifier, wherein prior to receiving the activation signal the interrogator only awaits receiving the activation signal from the trigger tag and is incapable of interrogating a radio frequency tag, and wherein after the interrogator is in the interrogation mode the interrogator interrogates the radio frequency tag and does not interrogate the trigger tag.

9. The system of claim 8, further comprising: a second trigger device including a second trigger sensor and a second trigger tag, the second trigger sensor detecting a second trigger event, the second trigger tag transmitting a deactivation signal upon detection of the second trigger event, the deactivation signal including a second unique identifier of the second trigger tag, wherein the interrogator receives the deactivation signal, validates the second unique identifier of second trigger tag in the deactivation signal and switches from the interrogation mode back to the listening mode upon validation of the unique identifier.

10. The system of claim 8, wherein the trigger sensor is one of a line of sight detector and a pressure sensor.

11. The system of claim 8, wherein the trigger tag is one of an active RFID tag and a passive RFID tag.

12. The system of claim 8 wherein the interrogator, in interrogation mode, interrogates additional tags.

13. The system of claim 8, wherein the unique identifier is an EPC value.

14. The system of claim 8, wherein radio frequency emissions of the interrogator are substantially zero in the listening mode.

15. The system of claim 8, wherein the interrogator further includes a memory storing unique identifiers, the validating of the unique identifier of the trigger tag being performed by comparing the unique identifier to the store unique identifiers.

16. The system of claim 9, wherein the second trigger tag is one of an active RFID tag and a passive RFID tag.

17. The system of claim 8, wherein the interrogator is configured transmit a second activation signal causing a second interrogator to switch from a listening mode to a interrogation mode.

18. A method of operating an interrogation device, comprising the steps of:
   listening, in a listening mode, on a predetermined radio frequency for an activation signal;
   validating the activation signal is received from one of associated trigger tags; and
   switching from the listening mode to an interrogation mode, wherein the interrogation mode includes the emission of radio frequency waves to interrogate RFID tags, wherein prior to receiving the activation signal the interrogation device only awaits receiving the activation signal from the one of the trigger tags and is incapable of interrogating a radio frequency tag, and wherein after the interrogator is in the interrogation mode the interrogator interrogates the radio frequency tag and does not interrogate the trigger tags.

19. The method of claim 18, further comprising the steps of: listening, in the interrogation mode, for a deactivation signal; validating the deactivation signal is received from one of the associated trigger tags; and switching from the interrogation mode to the listening mode, wherein the listening mode includes substantially zero radio frequency emissions.

20. The method of claim 18, wherein the activation signal includes a unique identifier of the one of the associated trigger tags.

21. The method of claim 20, wherein the validating step includes comparing the unique identifier with stored unique identifiers.

* * * * *

UNITED STATES PATENT AND TRADEMARK OFFICE
CERTIFICATE OF CORRECTION

| | | |
|---|---|---|
| PATENT NO. | : 7,573,366 B2 | Page 1 of 1 |
| APPLICATION NO. | : 11/095348 | |
| DATED | : August 11, 2009 | |
| INVENTOR(S) | : Willins et al. | |

It is certified that error appears in the above-identified patent and that said Letters Patent is hereby corrected as shown below:

IN THE CLAIMS

1. In Column 7, Line 48, in Claim 3, delete "of" and insert -- of: --, therefor.

2. In Column 8, Line 52, in Claim 17, delete "configured transmit" and insert -- configured to transmit --, therefor.

Signed and Sealed this

Sixteenth Day of February, 2010

David J. Kappos
*Director of the United States Patent and Trademark Office*